United States Patent
Saxena et al.

(10) Patent No.: US 11,472,333 B1
(45) Date of Patent: Oct. 18, 2022

(54) SEARCHLIGHT CONTROL SYSTEMS AND METHODS FOR MOVING A BEAM OF LIGHT EMITTED BY A SEARCHLIGHT ON A MOBILE PLATFORM AT A CONSTANT GROUND SPEED

(71) Applicant: HONEYWELL INTERNATIONAL INC., Charlotte, NC (US)

(72) Inventors: Sunit Kumar Saxena, Urbana, OH (US); Abhijit Kulkarni, Bangalore (IN); Kartik Brahmbhatt, Mississauga (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/320,531

(22) Filed: May 14, 2021

(30) Foreign Application Priority Data

Apr. 1, 2021 (IN) .............................. 202111015604

(51) Int. Cl.
| | |
|---|---|
| *B64D 47/02* | (2006.01) |
| *F21V 14/02* | (2006.01) |
| *G01C 3/00* | (2006.01) |
| *B60Q 1/24* | (2006.01) |
| *F21S 41/60* | (2018.01) |
| *F21W 102/20* | (2018.01) |
| *F21W 107/30* | (2018.01) |

(52) U.S. Cl.
CPC .............. *B60Q 1/245* (2013.01); *B64D 47/02* (2013.01); *F21S 41/60* (2018.01); *F21V 14/02* (2013.01); *B60Y 2200/52* (2013.01); *F21W 2102/20* (2018.01); *F21W 2107/30* (2018.01); *G01C 3/00* (2013.01)

(58) Field of Classification Search
CPC ...... B26B 21/4056; B64D 47/02; F21V 14/02
See application file for complete search history.

(56) References Cited

U.S. PATENT DOCUMENTS

| | | |
|---|---|---|
| 3,338,147 A | 8/1967 | Goddard |
| 7,241,034 B2 | 7/2007 | Smith et al. |
| 7,245,251 B2 | 7/2007 | Vogel et al. |
| 8,405,723 B2 | 3/2013 | von Flotow et al. |

(Continued)

FOREIGN PATENT DOCUMENTS

WO    2015073540 A1    5/2015

*Primary Examiner* — Alexander K Garlen
(74) *Attorney, Agent, or Firm* — Lorenz & Kopf, LLP

(57) ABSTRACT

Systems and methods for moving an illumination spot of a searchlight beam at a constant groundspeed. The method includes receiving state data comprising an attitude for the mobile platform. The method computes an elevation angle, theta, of the beam as a function of the attitude, an elevation actuator angle and a known mounting orientation for the searchlight. Responsive to receiving a searchlight control command from a user input device, the method determines a respective rate of change of theta, dtheta/dt, and rate of change of Psi, dPsi/dt, required to maintain the constant groundspeed of the illumination spot, as a function of the state data. The method updates theta responsive to the determined dtheta/dt and generates actuator control commands for an elevation actuator based thereon. The method updates Psi responsive to the determined dPsi/dt, and generates actuator control commands for an azimuth actuator based thereon.

20 Claims, 5 Drawing Sheets

Illustrating the Change in Beam Position on Ground as the Searchlight Elevation Angle is Changed from $\theta_1$ to $\theta_2$ and Altitude changes h1 to h2.

(56) References Cited

U.S. PATENT DOCUMENTS

| | | | |
|---|---|---|---|
| 8,996,203 B2 | 3/2015 | Campbell et al. | |
| 10,308,330 B1* | 6/2019 | Spivak | F21V 21/15 |
| 10,670,249 B1 | 6/2020 | Brahmbhatt et al. | |
| 10,723,482 B1* | 7/2020 | Salesse-Lavergne | B64D 45/08 |
| 10,882,637 B1 | 1/2021 | Das et al. | |
| 11,274,815 B1* | 3/2022 | Sure | B64D 47/04 |
| 2007/0091609 A1* | 4/2007 | Solberg | B63B 45/02 362/287 |
| 2012/0268958 A1 | 10/2012 | Kasaba et al. | |
| 2013/0261849 A1* | 10/2013 | Jungwirth | B64D 47/02 701/1 |
| 2020/0172264 A1 | 6/2020 | Das et al. | |
| 2020/0240602 A1* | 7/2020 | Huang | B60Q 1/245 |
| 2020/0247557 A1 | 8/2020 | Salesse-Lavergne | |
| 2020/0309537 A1 | 10/2020 | Kulkarni et al. | |
| 2020/0324912 A1* | 10/2020 | De Brouwer | F21V 14/02 |
| 2021/0245655 A1* | 8/2021 | Giffen | F21S 41/657 |

\* cited by examiner

Illustrating the Change in Beam Position on Ground as the Searchlight Elevation Angle is Changed from $\theta_1$ to $\theta_2$ and Altitude changes h1 to h2.

Illustrating Variable Ground Speed in Conventional Searchlight Control.

SEARCHLIGHT CONTROL SYSTEMS AND METHODS FOR MOVING A BEAM OF LIGHT EMITTED BY A SEARCHLIGHT ON A MOBILE PLATFORM AT A CONSTANT GROUND SPEED

CROSS REFERENCE TO RELATED APPLICATION

This application claims priority to Indian Provisional Patent Application No. 202111015604, filed Apr. 1, 2021, the entire content of which is incorporated by reference herein.

TECHNICAL FIELD

The technical field generally relates to searchlight control systems on mobile platforms, and more particularly, relates to searchlight control systems and methods for moving a beam of light emitted by a searchlight on a mobile platform at a constant ground speed.

BACKGROUND

Searchlight control systems generally include a searchlight mounted on a mobile platform (referred to herein as a mobile platform searchlight). The searchlight is an illumination apparatus that emits a beam of light. The beam of light has an illumination spot that may be used to illuminate a point of interest on the ground while the mobile platform is in the air.

In operation of available searchlight control systems, a light emitting source (such as an LED array) in the searchlight emits the beam of light. Movement of the beam of light and associated illumination spot on the ground is generally controlled with elevation actuators and azimuth actuators that are operationally coupled to the light emitting source (such as an LED array) in the searchlight. An azimuth/elevation command generally causes an actuator angle change in the respective actuator, which results in a movement of the illumination spot on the ground.

In available systems, the rate of change of the actuators' angles often remains constant, meaning that, to achieve movement of the beam of light, the azimuth actuators are rotated at a nearly constant average angular velocity. However, moving the beam of light at a constant angular speed has various drawbacks.

Accordingly, improved searchlight control systems and methods are desirable. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for moving a beam emitted by a searchlight on a mobile platform at a constant groundspeed. The system comprising: a searchlight apparatus comprising the searchlight, an elevation actuator, and an azimuth actuator, the search light mounted on the mobile platform with a known mounting orientation and operationally coupled to the elevation actuator and the azimuth actuator, the elevation actuator configured to respond to elevation actuator commands to move to an elevation actuator angle, the azimuth actuator configured to respond to azimuth actuator commands to move to an azimuth actuator angle; a source of a known mounting orientation for the searchlight, the elevation actuator angle and the azimuth actuator angle; a user input device; and a controller architecture integrated with the searchlight apparatus, the source of a known mounting orientation, and the user input device, and programmed by programming instructions to: receive SL-status data for the mobile platform, the SL-status data comprising an attitude and altitude; compute an elevation angle, theta, of the beam as a function of the attitude, the elevation actuator angle and the known mounting orientation for the searchlight; compute an azimuth angle, Psi, of the beam as a function of the attitude, the azimuth actuator angle and the known mounting orientation for the searchlight; receive a searchlight control command from the user input device; determine, responsive to the searchlight control command, a respective rate of change of theta, dtheta/dt and a rate of change of Psi, dPsi/dt, required to maintain the constant groundspeed of the illumination spot, as a function of the SL-status data; update theta responsive to the determined dtheta/dt; update Psi responsive to the determined dPsi/dt; and generate azimuth actuator commands and elevation actuator commands, as a function of dPsi/dt and dtheta/dt.

Another system for moving an illumination spot of a beam emitted by a searchlight on a mobile platform at a constant groundspeed is provided. The system comprising: a controller module, the controller module configured to: reference a known mounting orientation on the mobile platform for the searchlight; compute attitude of the mobile platform; compute an elevation angle (theta) of the beam as a function of the attitude of the mobile platform, an elevation actuator angle and the known mounting orientation for the searchlight; compute an azimuth angle, Psi, of the beam as a function of the attitude, the azimuth actuator angle and the known mounting orientation for the searchlight; and an input interface module operating onboard the mobile platform, the input interface module configured to: receive a searchlight control command from a pilot; generate, as a function of the searchlight control command, a slew azimuth signal and a slew elevation signal; and communicate the slew azimuth signal and slew elevation signal to the searchlight control module; the controller module further configured to: determine, responsive to the slew elevation signal and slew azimuth signal, a respective rate of change of theta, dtheta/dt and a rate of change of Psi, dPsi/dt, required to maintain the constant groundspeed of the illumination spot, as a function of the SL-status data; update theta responsive to the determined dtheta/dt; update Psi responsive to the determined dPsi/dt; and generate azimuth actuator commands and elevation actuator commands, as a function of dtheta/dt and dPsi/dt.

A method for moving an illumination spot of a beam emitted by a searchlight on a mobile platform at a constant groundspeed is provided. The method comprising: at a processor, receiving SL-status data comprising an attitude for the mobile platform; computing an elevation angle, theta, of the beam as a function of the attitude, an elevation actuator angle and a known mounting orientation for the searchlight; receiving a searchlight control command comprising a searchlight elevation control command and an azimuth control command from a user input device; determining, responsive to the searchlight elevation control command, a respective rate of change of theta, dtheta/dt, required to maintain the constant groundspeed of the illumination spot, as a function of the SL-status data; determining, responsive to the searchlight azimuth control command, a respective rate of change of Psi, dPsi/dt, required to maintain the constant groundspeed of the illumination spot, as a function of the SL-status data; generating elevation actuator commands, as a function of dtheta/dt; and generating azimuth actuator commands as a function of dPsi/dt.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

Figure 1:
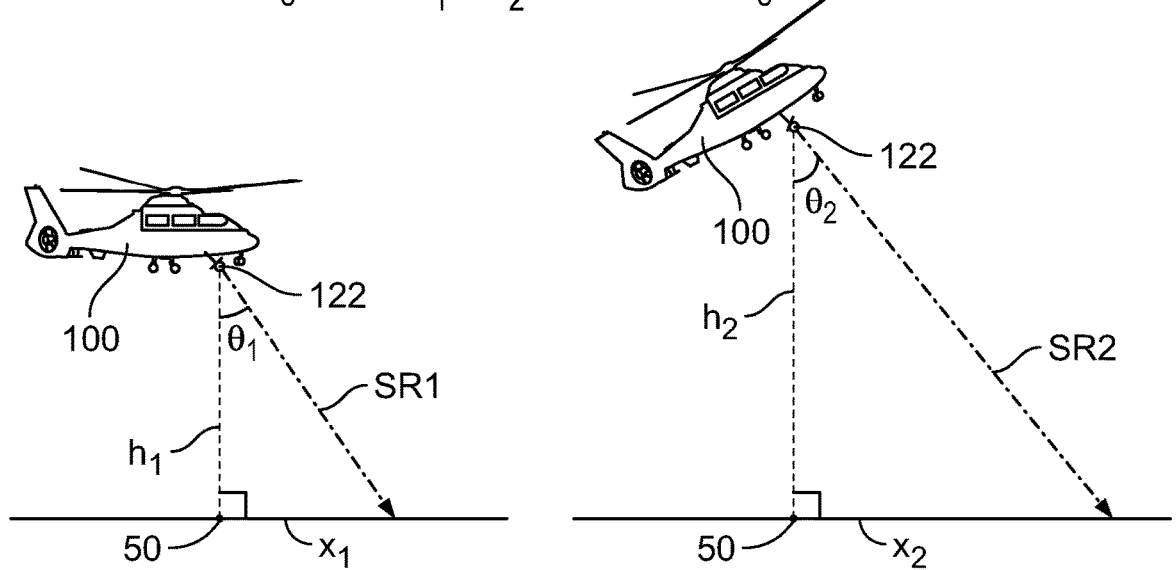
FIGS. 1-3 define terms used to describe movement of the illumination spot of a beam emitted by a searchlight.
Figure 2:
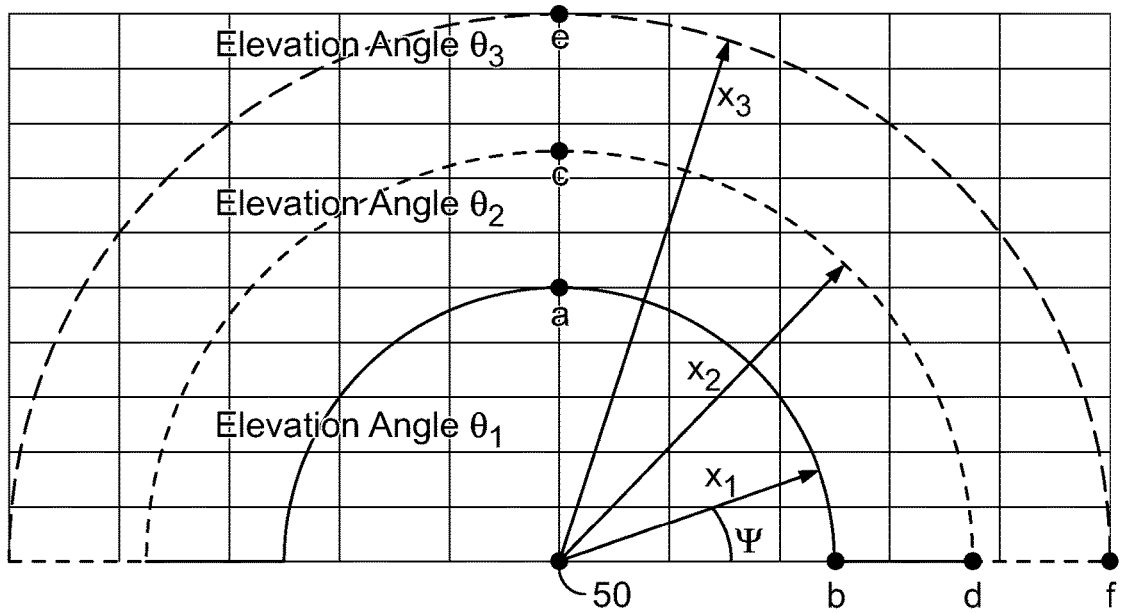
Figure 3:
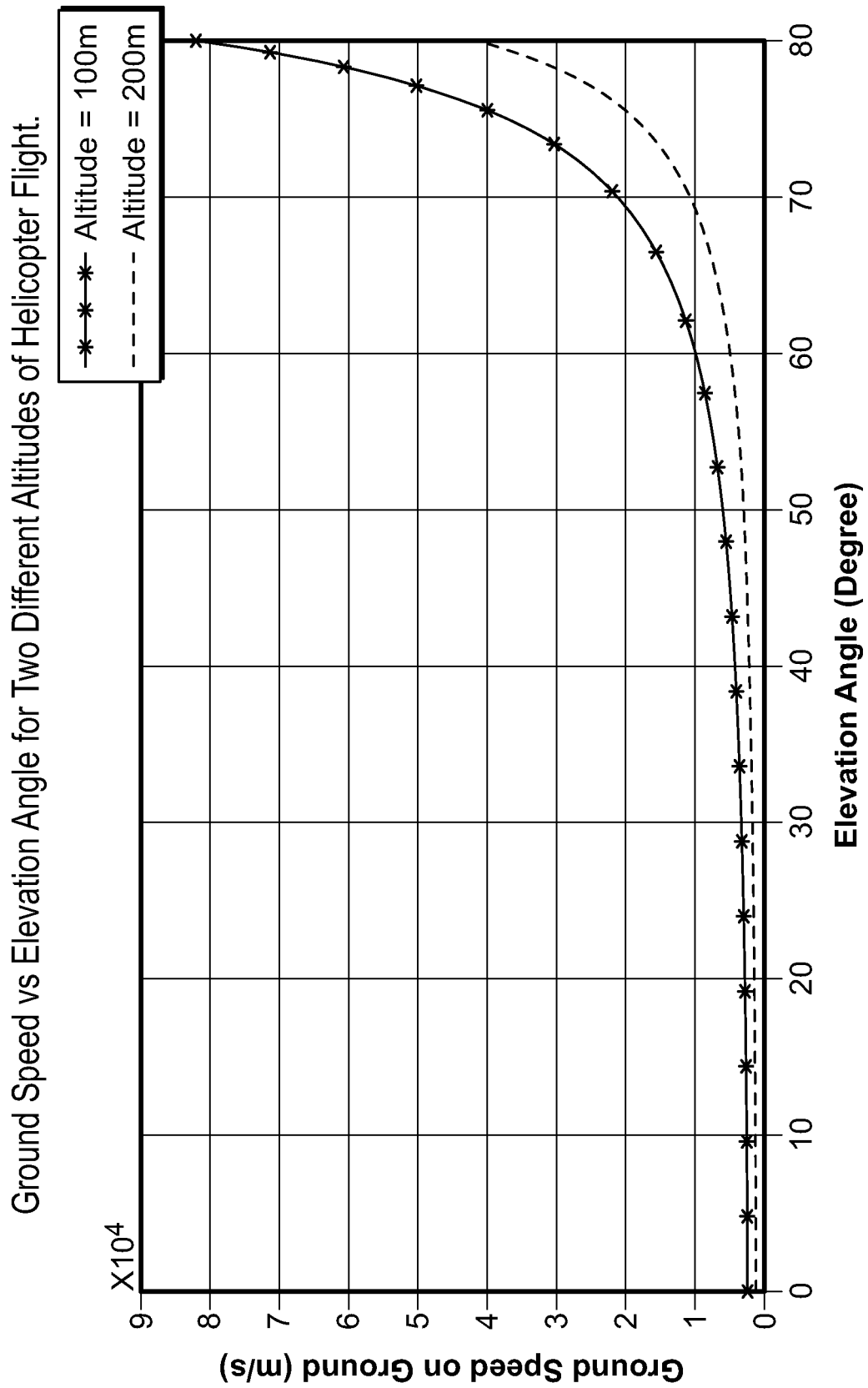
Figure 4:
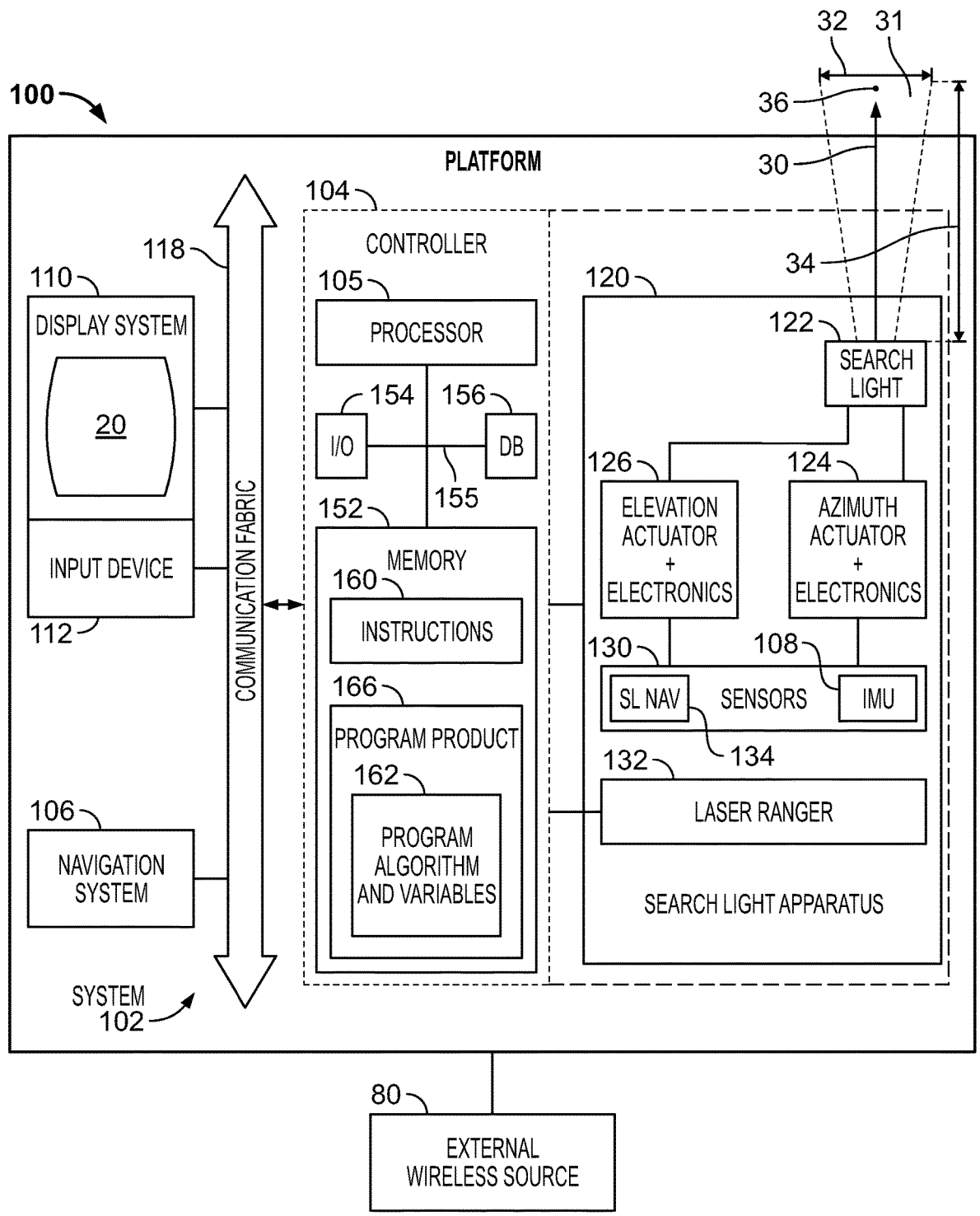
FIG. 4 is a block diagram of a system for moving a beam of light emitted by a searchlight on a mobile platform at a constant ground speed, in accordance with an exemplary embodiment.

The illustrations in FIGS. 1-3 define terms used herein to describe movement of the illumination spot of a beam emitted by a searchlight. FIG. 1 is a two-dimensional illustration showing a mobile platform that is a rotorcraft 100; having mounted thereon a searchlight apparatus (FIG. 4, 120) with a searchlight 122 configured to emit a beam of light (FIG. 4, 31). The orientation of the beam of light 31, and associated illumination spot on the ground, is controlled in part by an elevation actuator that is operationally coupled to a light emitting source (such as an LED array) in the searchlight 122. The elevation angle theta ($\theta$) measured from the Z axis (the Z axis is a vector normal to the ground and is also referred to as the height and the altitude or distance above ground level) is controlled by an elevation actuator. In other words, theta ($\theta$) is an angle between the light beam axis and a vector that is normal to ground. Hereafter, the elevation angle and beam elevation angle will be used interchangeably and they both are known as theta ($\theta$). The beam elevation angle is controlled by an elevation actuator, but inevitable to change due to the change in rotorcraft's attitude (especially pitch and roll of the rotorcraft). The orientation of the beam of light 31, and associated illumination spot on the ground, is also partly a function of height, h.

FIG. 1 shows the beam of light 31 emitted at a first elevation angle theta1 ($\theta$1) forming a slant range SR1 and a second elevation angle theta2 ($\theta$2) forming a slant range SR2. The beam of light is understood to be directed along the SR1 and the SR2, which are each a hypotenuse of a right triangle measured at a center point 50 that is directly below the rotorcraft 100, as shown. The length of the hypotenuse (SR1, SR2) is referred to as the slant range or distance to a target, from the perspective of the rotorcraft 100. A horizontal displacement, distance X from the center point 50, is a result of the magnitude of ($\theta$). On the left, when the rotorcraft 100 is at first height h1 with elevation angle theta1, the SR1 touches ground at a distance X1 from the center point 50. On the right, when the rotorcraft 100 is at second height h2, with elevation angle theta2, the SR2 touches ground at a distance X2 from the center point 50. Although the figure is not to scale, the relative relationships between heights, distances, and theta are reliable (i.e., theta1 is smaller than theta2, and h1 is smaller than h2, and X1 is smaller than X2). As may be appreciated, the elevation angle theta ($\theta$) can also be changed while holding the height constant (e.g., at h1, changing from theta1 to theta2). When the horizontal displacement X (Target Distance) is calculated using slant range SR, with the equation X=SR multiplied by Sine ($\theta$), then the altitude or height "h" can be computed using the following steps: h=x/tan($\theta$). It is to be noted that the slant range SR is measured by a Laser Range Finder, (FIG. 4, Ranger 132).

With X determined, azimuth actuators control an azimuth angle Psi ($\psi$) to rotate the beam of light along the ground at the SR, following a circular path (an arc) at the distance X from the center point 50. As mentioned, in available systems, the azimuth actuators are often rotated at a nearly constant average angular velocity, which has various drawbacks; this is illustrated with FIG. 2. FIG. 2 is a top-down 180 degree view that depicts three exemplary paths on the ground that the beam of light (and associated illumination spot) may traverse when the rotorcraft 100 is held at a constant position (constant position meaning here that latitude-longitude and height are constant) above center point 50, and with a constant elevation angle theta and SR. A first path a-b traverses one quadrant, or 90 degrees of azimuth angle at elevation angle theta1 in a first arc distance (a to b). A second path c-d traverses the same 90 degrees of azimuth angle at elevation angle theta2 at a longer arc distance (c to d). A third path e-f traverses the same 90 degrees of azimuth angle at elevation angle theta3 at an even longer arc distance (e to f). When the azimuth angular velocity is constant, the quadrant or 90 degrees is traversed in the same amount of time, but the distance travelled is not. As a result, a technical problem is illustrated in an undesirable variable ground speed; from a perspective of the illumination spot on the ground, a ground speed from e-f is faster than a ground speed from c-d and the ground speed from c-d is faster than the ground speed from a-b.

With reference back to FIG. 1, an elevation angle theta ($\theta$) of zero results in a beam straight down on center point 50, and an elevation angle theta ($\theta$) of 90 degrees corresponds to the beam of light shining out in front of the rotorcraft, horizontally. FIG. 3 is used to illustrate that, holding height constant and varying the elevation angle theta has only minimal effect on ground speed below a theta ($\theta$) of about 50 degrees; above about 70 degrees, the elevation angle theta (θ) has a large effect on the ground speed. This further illustrates the technical problem of variable ground speed for the illumination spot of the beam of light.

Specifically, the elevation actuator is configured to respond to elevation actuator commands to move to an elevation actuator angle (elevation angle theta (θ)); and, the azimuth actuator is configured to respond to azimuth actuator commands to move to an azimuth actuator angle (azimuth angle Psi (ψ)). The orientation of the beam is a function of the angles caused by these two actuators. Further, the searchlight apparatus configured to provide, as an output, the known mounting orientation for the searchlight, the current elevation actuator angle and the current azimuth actuator angle; specifically, these values may be provided by encoders described below.

For simplicity, the following shorthand is used: the beam of light is shortened to "beam," and moving the beam/beam ground speed is analogous to moving the illumination spot of the beam/illumination spot ground speed. Accordingly, FIGS. 1-3 illustrate that the beam ground speed depends on several factors such as: the elevation angle theta (θ) of the searchlight, the state (orientation, attitude, pitch, altitude) of the helicopter, and the range, or target distance. FIGS. 1-3 also illustrate a technical problem with available searchlight control systems, that of being unable to provide a constant ground speed for the beam of light and its associated illumination spot. In addition to providing less viewing times on a given area at higher ground speeds, the illumination spot on ground can appear to move with considerable 'jumps' at higher ground speeds.

The present invention introduces a novel technical solution and approach to this problem, in the form of systems and methods that ensure that the beam speed on ground is constant (i.e. controllable) irrespective of the elevation angle theta (θ), the state of the helicopter, and the range. Provided embodiments give additional control to the pilot by accelerating the actuators, if necessary, for a situation, this delivers an improved searchlight performance. This invention also provides an objectively improved human-machine interface (HMI) because it significantly boosts the pilot's ability to control resolution and therefore visualization of objects on the ground. The figures and descriptions below provide more detail.

Turning now to FIG. 4, exemplary embodiments of the system for moving an illumination spot of a beam emitted by a searchlight on a mobile platform at a constant ground speed 102 (also referred to herein as "system" 102) is generally associated with a mobile platform. As indicated, in various embodiments, the mobile platform is a rotorcraft 100. The system 102 provides a technical solution in the form of a searchlight controller (FIG. 4, controller 104, whose functions may also be managed by a control module) embodying novel rules and parameters. In some embodiments, the controller architecture 104 may be integrated within a preexisting mobile platform management system, avionics system, cockpit display system (CDS), flight controls system (FCS), or rotorcraft flight management system (FMS). Although the controller architecture 104 is shown as an independent functional block, onboard the rotorcraft 100, in other embodiments, it may exist in an electronic flight bag (EFB) or portable electronic device (PED), such as a tablet, cellular phone, or the like. In embodiments in which the controller architecture is within an EFB or a PED, a display system 110 and a user input device 112 may also be part of the EFB or PED. The controller architecture 104 may be operationally coupled to any combination of the following rotorcraft systems: a communication system and fabric 118; a rotorcraft inertial navigation system 106; a display system 110; a user input device 112; and, an external source 80 that communicates wirelessly with the controller architecture 104. The functions of these rotorcraft systems, and their interaction, are described in more detail below.

The user input device 112 and the controller architecture 104 are cooperatively configured to allow a user (e.g., a pilot, co-pilot, or crew member) to interact with display devices in the display system 110 (e.g., providing a human-machine interface (HMI)), and/or other elements of the system 102, as described in greater detail below. Depending on the embodiment, the user input device 112 may be realized as a cursor control device (CCD), keypad, touchpad, keyboard, mouse, touch panel (or touchscreen), joystick, knob, line select key, voice controller, gesture controller, or another suitable device adapted to receive input from a user. A common user input device 112 for searchlight control is called a collective stick grip, or thrust grip, having a hat switch. The hat switch can be manipulated in four directions (for example, rotate right, rotate left, forward/extend, and reverse/retract) sequentially, generating slew inputs that can be used by the controller architecture 104 as described herein. Rotate right and rotate left are slew azimuth inputs whereas extend/forward and retract/reverse are slew elevation inputs. In some embodiments, the user input device 112 is a source of the following four controls: slew azimuth positive, slew azimuth negative, slew elevation positive, and slew elevation negative. As used here, a "slew positive" is an increase, and a "slew negative" is a decrease. A pilot can also request no change to the azimuth or elevation actively, by affirmatively entering a "slew azimuth zero" and "slew elevation zero" (respectively), or passively, by not entering a user input.

When the user input device 112 is configured as a touchpad or touchscreen, it may be integrated with the display system 110. As used herein, the user input device 112 may be used by a pilot to communicate with external sources, to modify or upload the program product 166, etc. In various embodiments, the display system 110 and user input device 112 are onboard the rotorcraft 100 and are also operationally coupled to the communication system and fabric 118. In some embodiments, the controller architecture 104, user input device 112, and display system 110 are configured as a control display unit (CDU). In various embodiments, the user input device 112 is operated by an input interface module (a processing module). The input interface module is then configured to receive a searchlight control command from a pilot; generate, as a function of the searchlight control command, a slew azimuth signal and a slew elevation signal; and communicate the slew azimuth signal and slew elevation signal to the searchlight control module.

In various embodiments, the communications system and fabric 118 is configured to support instantaneous (i.e., real time or current) communications between on-board systems, the controller architecture 104, and one or more external data source(s) 50. As a functional block, the communications system and fabric 118 may represent one or more transmitters, receivers, and the supporting communications hardware and software required for components of the system 102 to communicate as described herein. In various embodiments, the communications system and fabric 118 may have additional communications not directly relied upon herein, such as bidirectional pilot-to-ATC (air traffic control) communications via a datalink, and any other suitable radio communication system that supports communications between the rotorcraft 100 and various external source(s).

A real-time rotorcraft state is described by status data. The real-time rotorcraft state may be described by any of: an instantaneous location (e.g., the latitude, longitude, orientation), an instantaneous heading (i.e., the direction the rotorcraft is traveling in relative to some reference), a pitch or flight path angle, a vertical speed, a ground speed, an instantaneous altitude (or height above ground level), and a current phase of flight of the rotorcraft 100. As used herein, "real-time" is interchangeable with current and instantaneous.

Status data used in various rotorcraft functions is generated by the rotorcraft inertial navigation system 106. The rotorcraft inertial navigation system 106 may be realized as including a global positioning system (GPS), attitude and heading reference system (AHRS) configured to provide a pitch, inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. In various embodiments, the data referred to herein as the real-time rotorcraft state data may be referred to as navigation data. The real-time rotorcraft status data is made available, generally by way of the communication system and fabric 118, so other components, such as the controller architecture 104 and the display system 110, may further process and/or handle the rotorcraft state data.

In various embodiments, as indicated with dashed lines, the controller architecture 104 is integrated with, or includes a searchlight apparatus 120.

The searchlight apparatus 120 comprises a light source, referred to as searchlight 122, that projects a three-dimensional beam of light (FIG. 4, 31) along a beam axis 30 to land on the ground (or a surface) having an illumination spot 36. The beam of light 31 generally surrounds the beam axis 30 and extends uniformly therefrom in a radial direction. The searchlight 122 is mounted on the mobile platform with a known mounting orientation. The orientation of the searchlight 122 and resulting beam axis 30, with respect to the rotorcraft 100, is controlled by one or both of an azimuth actuator 124 and electronics, and an elevation actuator 126 and electronics. The azimuth actuator 124 and electronics include an encoder that provides a current azimuth angle (Psi) and the elevation actuator 126 and electronics include an encoder that provides a current elevation angle (theta).

Sensors 130 include various types of sensors. Sensors 130 include SL-Nav 134, which provide SL-status data; SL-status data is equal to, but independent from, the status data from the navigation system 106. The SL-Nav 134 may be realized using any of the same systems described above for the implementation of the Navigation system 106, and SL-status data is only distinguished from status data here to show the source from which it came.

Sensors 130 also include a source of a distance measurement, such as, an inertial measurement unit (IMU 108). The presence of the SL-Nav 134 and the IMU 108 make the controller architecture 104 completely operational without dependence upon a rotorcraft navigation system 106 and/or a rotorcraft IMU, if there were one onboard.

In summary, in various embodiments, the controller architecture 104 is an integration of a controller module or circuit with the searchlight apparatus 120, and dedicated sensors 130. In some embodiments, sensors 130 may additionally include sensors for detecting orientation and configuration status of the searchlight 122 and converting this status information into electrical signals for processing.

In some embodiments, a laser range finder, laser ranger 132, is integrated within the searchlight apparatus 120, and is configured to determine the range from the searchlight 122 to the beam axis touchdown, referred to as the illumination spot on the ground. Data from the laser range finder can be used by the system 102 to generate an estimated altitude based on data from the laser range finder, the elevation actuator angle, and the azimuth actuator angle. Searchlight data refers to the known mounting orientation for the searchlight and to the sensor data (current elevation angle and azimuth), in various embodiments. In embodiments having a laser ranger 132, searchlight data additionally includes range data.

As is described in more detail below, the controller architecture 104 can process the data from the IMU 108 and the data from the laser ranger 132 to adjust the actuator angles in very fine increments. However, the controller architecture 104 can also control the beam ground speed without receiving data from the IMU 108 and the laser ranger 132; in these embodiments, the solution is a software solution.

The controller architecture 104 may be said to display various images and selectable options described herein. In practice, this may mean that the controller architecture 104 generates display commands, and, and the display system 110, responsive thereto, causes the display device 20 to render thereon the various graphical user interface elements, tables, icons, alerts, menus, buttons, and pictorial images, as described herein. Display methods include various types of computer-generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes.

The display system 110 is configured to continuously receive and process the display commands from the controller architecture 104. In various embodiments described herein, the display system 110 includes a synthetic vision system (SVS). In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

The controller architecture 104 performs the functions of the system 102. In some embodiments, the controller architecture may be a "module;" wherein a module refers to any means for facilitating communications and/or interaction between the elements of the system 102 and performing additional processes, tasks and/or functions to support operation of the system 102, as described herein. In various embodiments, the controller architecture 104 may be any hardware, software, firmware, electronic control component, processing logic, and/or processor device, individually or in any combination. In some embodiments, the controller architecture 104 may be implemented as an enhanced computer system, realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 4, an embodiment of the controller architecture 104 is depicted as a computer system comprising a processor 105 and a memory 152. The processor 105 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 105. Generally, the memory 152 maintains data bits and may be utilized by the processor 105 as storage and/or a scratch pad during operation. Specifically, the memory 152 stores instructions and applications 160. Information in the memory 152 may be organized and/or imported from an external source during an initialization step of a process; it may also be programmed via a user input device 112. During operation, the processor 105 loads and executes one or more programs, algorithms and rules embodied as instructions and applications 160 contained within the memory 152 and, as such, controls the general operation of the controller architecture 104 as well as the system 102.

The novel program 162 includes rules and instructions. Novel program 162 and associated stored variables 164 may be stored in a functional form on computer readable media, for example, as depicted, in memory 152. The processor 105 loads the program 162 (thereby being programmed with the program 162). When the processor 105 executes the program 162, this causes the controller architecture 104 to perform the functions, techniques, and processing tasks associated with the operation of the system 102. The program 162 directs the processing of searchlight data with real time navigation data and slew input (e.g., loci) to determine differences/deviations between past, current, and intended next positions, orientations and ranges, as described hereinbelow. While the depicted exemplary embodiment of the controller architecture 104 is described in the context of a fully functioning computer system, those skilled in the art will recognize that the mechanisms of the present disclosure are capable of being distributed as a program product 166.

As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 105) to load and execute the program 162. Such a program product 166 may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

In various embodiments, the processor/memory unit of the controller architecture 104 may be communicatively coupled (via a bus 155) to an input/output (I/O) interface 154, and a database 156. The bus 155 serves to transmit programs, data, status and other information or signals between the various components of the controller architecture 104. The bus 155 can be any suitable physical or logical means of connecting computer systems and components. This includes, but is not limited to, direct hard-wired connections, fiber optics, infrared and wireless bus technologies.

The I/O interface 154 enables intra controller architecture 104 communication, as well as communications between the controller architecture 104 and other system 102 components, and between the controller architecture 104 and the external data sources via the communication system and fabric 118. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 118 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 is integrated, either within the controller architecture 104 or external to it. Accordingly, in some embodiments, cartesian patterns and/or terrain maps are pre-loaded and internal to the controller architecture 104.

When the controller architecture 104 is implemented as a process module, the resulting controller module is configured to reference a known mounting orientation on the mobile platform for the searchlight; compute attitude of the mobile platform; compute an elevation angle (theta) of the beam as a function of the attitude of the mobile platform, an elevation actuator angle Psi and the known mounting orientation for the searchlight; update theta as a function of the slew elevation signal; determine a rate of change of the elevation angle (dtheta/dt) required to maintain the constant groundspeed of the illumination spot, responsive to updating theta and a mobile platform altitude; and control actuation of the searchlight as a function of dtheta/dt, responsive to updating theta, by generating actuator control command for an elevation actuator; update Psi as a function of the slew azimuth signal; determine a rate of change of the azimuth angle (dPsi/dt) required to maintain the constant groundspeed of the illumination spot, responsive to updating Psi and a mobile platform altitude; and control actuation of the searchlight as a function of dPsi/dt, responsive to updating Psi, by generating actuator control command for an azimuth actuator.

Figure 5:
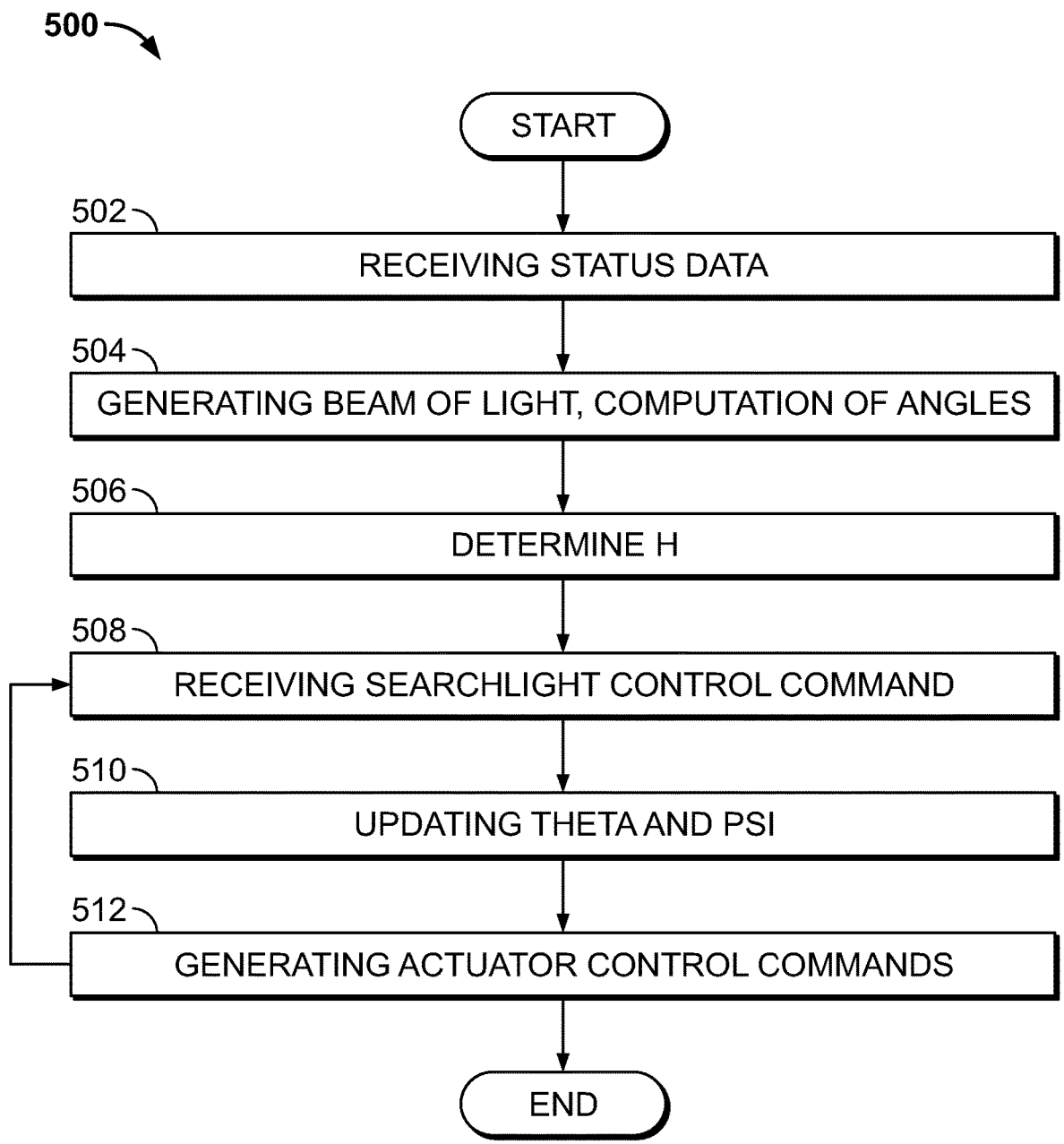
FIG. 5 depicts a method for moving a beam of light emitted by a searchlight on a mobile platform at a constant ground speed, in accordance with an exemplary embodiment.

The system 102 may make its determinations and selections in accordance with a method such as method 500 of FIG. 5. With continued reference to FIGS. 1-5, a flow chart is provided for a method 500 for providing a system 102, in accordance with various exemplary embodiments. Method 500 represents various embodiments of a method for adaptive clearance request prediction. For illustrative purposes, the following description of method 500 may refer to elements mentioned above in connection with FIG. 4. In practice, portions of method 500 may be performed by different components of the described system. It should be appreciated that method 500 may include any number of additional or alternative tasks, the tasks shown in FIG. 5 need not be performed in the illustrated order, and method 500 may be incorporated into a more comprehensive procedure or method having additional functionality not described in detail herein. Moreover, one or more of the tasks shown in FIG. 5 could be omitted from an embodiment of the method 500 if the intended overall functionality remains intact.

Prior to the method starting, the controller architecture 104 is initialized and the system 102 is in operation. Initialization may comprise uploading or updating instructions and applications 160, program 162, parameters, pre-programmed thresholds, lookup tables, and formatting instructions. Parameters may include, for example, configurable parameters k and alpha, described below, pre-programmed range and orientation thresholds, parameters for setting up a user interface, and the various shapes, various colors and/or visually distinguishing techniques used for renderings on the display system 110. In some embodiments, program 162 includes additional instructions and rules for rendering information differently based on type of display device in the display system 110.

At 502, rotorcraft SL-status data is continuously received from a source, such as the SL-Nav 134, which provides a rotorcraft altitude, latitude and longitude; the controller architecture 104 reads the actuator encoder data from elevation actuator 126 and electronics; the controller architecture 104 reads the azimuth encoder data from azimuth actuator 126 and electronics; the controller architecture 104 reads the IMU 108 to obtain the attitude (yaw, pitch and roll angle) for the rotorcraft; and the searchlight mounting orientation is referenced. In some embodiments, at 502, a laser ranger 132 is used to estimate a target distance or range.

At 504, a searchlight 122 generates a beam of light 31 along a beam axis 30 as described and computes an effective elevation angle of the searchlight, simplified herein to the elevation angle, theta. Theta is a function of the attitude, the elevation actuator angle (provided by the encoder), and the known mounting orientation for the searchlight. In embodiments that do not have the IMU 108, the theta is a function of the elevation actuator angle (provided by the encoder) and the known mounting orientation for the searchlight.

At 504, the controller architecture 104 also reads the encoder data from azimuth actuator 124 and electronics and references the known mounting position of the searchlight 122 to obtain a reference Psi.

At 506 the altitude or height, h can be determined. With reference to FIG. 1, geometry provides that SR (Slant Range) is determined by equation 1, below.

$$h = SR \text{ Cosine } \theta \quad \text{Eq. 1}$$

Eq. 1, which can be used when the laser ranger 132 is used to find the Slant Range (SR).

In embodiments in which the laser ranger 132 is not installed, and if the controller architecture 104 has access to the navigation system 106, it may use GPS sensor data from the navigation system 106 to estimate the altitude "h".

In embodiments in which the laser ranger 132 is not installed, and the controller architecture 104 does not have access to rotorcraft GPS data is not available, the altitude "h" can be set at a constant value representing typical altitude of mobile platform for a similar operation.

At 508, a searchlight control command is received from a user input device. At 510, responsive to the searchlight control command, the system 102 updates elevation angle theta. In order to update theta, the system 102 determines a rate of change of theta necessary to meet the searchlight control command while keeping ground speed constant. A process for determining the rate of change of theta may include the following steps. The derivative of the horizontal displacement, X, provides beam ground speed, v, as shown by equation 2, below.

$$\frac{dx}{dt} = v = \frac{dh}{dt}\tan\theta + h\sec^2\theta\frac{d\theta}{dt} \quad \text{Eq. 2}$$

Assuming that the altitude (h) does not vary significantly, the beam ground speed of Eq. 2 can be simplified as shown in equation 3, below. This was illustrated in FIG. 3.

$$v = h\sec^2\theta\frac{d\theta}{dt} \quad \text{Eq. 3}$$

Equation 3 illustrates that v is variable with theta, even when dθ/dt is constant. In order to make the beam speed, v, on the ground constant, the rate of change of the elevation angle (for the elevation actuator) needs to be changed. Introducing a configurable parameter k=v/h, in the proposed approach, the rate of change of theta, the elevation actuator angle, is shown in equation 4, below.

$$\frac{d\theta}{dt} = k\cos^2\theta \quad \text{Eq. 4}$$

Equation 4 can be written as equation 5, below.

$$\Delta\theta = kT_s \cos^2\theta \quad \text{Eq. 5}$$

Where $T_s$ is the sampling time that the controller architecture 104 uses to update the elevation angle. With Equation 5, a delta-theta, for an actuator control command for the elevation actuator, can be isolated. Using equation 5, theta can be updated responsive to the determined delta-theta at 510. Updating means adding or subtracting the delta-theta. At 510, a previous value of theta is updated by delta-theta, and this updated value is stored. A next time through the cycle, the stored value is the new previous value.

At 510, the controller architecture 104 also generates a delta-Psi (Δψ), as follows. With reference to FIG. 2, the movement along an arc (a-b, c-d, etc.) carved out by a respective radius X1, X2, in is referred to as ΔS.

Using a small arc approximation, in Equation 6, below:

$$\Delta S = x\Delta\psi \quad \text{Eq. 6}$$

The radius is the distance from the center point 50 along the X axis is referred to as x, and, as previously mentioned, x=h tan θ is the displacement distance on the ground due to searchlight elevation angle theta. In order to keep the beam speed constant at v, Equation 7 is used:

$$\frac{\Delta S}{\Delta t} = h\tan\theta * \frac{\Delta\psi}{\Delta L} = v \quad \text{Eq. 7}$$

Rearranging Eq. 7 provides the change in azimuth angle, delta-Psi, Δψ:

$$\Delta \psi = \frac{vT_s}{h\tan\theta} \qquad \text{Eq. 8}$$

As before, $T_s=\Delta t$ or the sampling time for the controller architecture 104 to update the azimuth angle.

Using equation 8, Psi ($\psi$) can be updated responsive to the determined delta-Psi at 510. At 510, a previous value of theta is updated by delta-Psi, and this updated value is stored. A next time through the cycle, the stored value is the new previous value.

Thus, when the user commands a change in azimuth angle (via Slew Azimuth Positive or Slew Azimuth Negative), the angle update is done as a function of the altitude and the beam elevation angle for a given beam speed required on the ground.

At 512, the system 102 generates actuator control commands for the azimuth actuator and the elevation actuator, the actuator control commands being a function of dPsi/dt and dtheta/dt. The new azimuth actuator angle is equal to the previous azimuth actuator angle plus an increment based on delta-Psi. The new elevation actuator angle is equal to the previous elevation actuator angle plus an increment based on delta-theta.

Further, by substituting equation 4 into equation 3, to obtain v=hk, making the beam ground speed practically constant. Further, the beam ground speed can be made independent of the altitude by making use of the laser range finder described above to obtain range, and back-calculating the helicopter altitude h over ground. Thus, to make the beam ground speed v truly independent of the altitude, k is made a variable and a controllable parameter alpha is introduced, as shown in equation 6, below.

$$k=\text{alpha}/h \qquad \text{Eq. 6}$$

After 512, the system may return to 508 and receive another searchlight control command from the user input device or may end.

Additionally, in various embodiments, the system 102 accepts an optional input from the pilot to revert the searchlight control back to the conventional scheme (i.e., cease performing steps 510-512).

Figure 6:
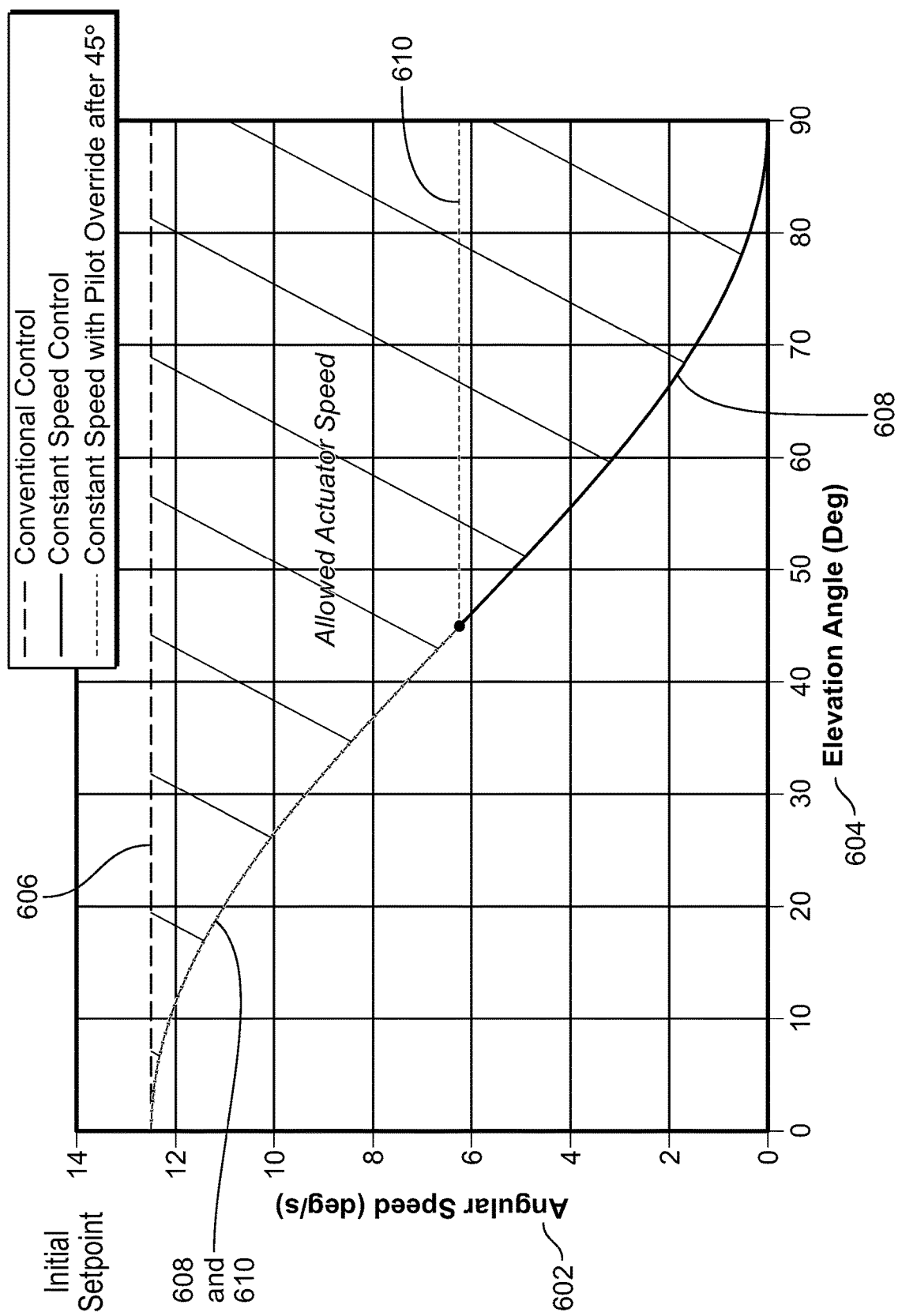
FIG. 6 is an illustration showing how the resulting constant ground speed achieved by the provided systems and methods.

FIG. 6 illustrates the angular rate of change of the elevation actuator angle 602 (shortened herein to angular rate 602) as a function of the elevation angle theta 604. Line 606 is horizontal, unchanging, from zero to 90 degrees; line 606 is what available searchlight control systems offer. Line 608 shows the angular rate 602 as a function of the elevation angle theta 604 provided by embodiments of the invention. As can be observed, at theta of zero degrees, the angular rate 602 is the same as the line 608, and this is an initial set point that is specific to the mobile platform and specifically to a motor speed of the searchlight apparatus. From the initial setpoint, the angular rate 602 is variable with theta, and it curves downward as theta increases. This means that the angular rate 602 decreases with increasing theta elevation angle theta. There is an inflection point in line 608 at about 45 degrees; at 90 degrees, the line 608 is at an angular rate of zero. Line 610 shows an optional pilot override at about 45 degrees. A pilot override can be received from the user input device; and, responsive to which, the system 102 ceases the implementation of the process steps of 510, thereby ceasing the decreasing the angular rate 602 with theta. After this, the system 102 holds the angular rate 602 steady at the value at which the override was received (approximately 6 degrees per second in the provided example) for the remaining theta values of 45 degrees to 90 degrees.

Thus, the proposed systems and methods for moving a beam of light emitted by a searchlight on a mobile platform at a constant ground speed are technologically improved over conventional approaches to searchlight control. As is readily appreciated, the above examples of the system 102 are non-limiting, and many others may be addressed by the controller architecture 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for moving a beam emitted by a searchlight on a mobile platform at a constant groundspeed, the system comprising:
    a searchlight apparatus comprising the searchlight, an elevation actuator, and an azimuth actuator, the search light mounted on the mobile platform with a known mounting orientation and operationally coupled to the elevation actuator and the azimuth actuator, the elevation actuator configured to respond to elevation actuator commands to move to an elevation actuator angle, the azimuth actuator configured to respond to azimuth actuator commands to move to an azimuth actuator angle;
    a source of a known mounting orientation for the searchlight, the elevation actuator angle and the azimuth actuator angle;
    a user input device; and
    a controller architecture integrated with the searchlight apparatus, the source of a known mounting orientation, and the user input device, and programmed by programming instructions to:
        receive SL-status data for the mobile platform, the SL-status data comprising an attitude and altitude;
        compute an elevation angle, theta, of the beam as a function of the attitude, the elevation actuator angle and the known mounting orientation for the searchlight;
        compute an azimuth angle, Psi, of the beam as a function of the attitude, the azimuth actuator angle and the known mounting orientation for the searchlight;
        receive a searchlight control command from the user input device;
        determine, responsive to the searchlight control command, a respective rate of change of theta, dtheta/dt and a rate of change of Psi, dPsi/dt, required to maintain the constant groundspeed of the illumination spot, as a function of the SL-status data;
        update theta responsive to the determined dtheta/dt;
        update Psi responsive to the determined dPsi/dt; and
        generate azimuth actuator commands and elevation actuator commands, as a function of dPsi/dt and dtheta/dt.

2. The system of claim 1, wherein the controller architecture is further programmed by programming instructions to:
    determine a delta-theta based on the result from dtheta/dt; and
    wherein updating theta is further responsive to delta-theta.

3. The system of claim 1, wherein the controller architecture is further programmed by programming instructions to:
    determine a delta-psi based on the result from dPsi/dt; and
    wherein updating Psi is further responsive to delta-Psi.

4. The system of claim 1, further comprising an attitude and heading reference system (AHRS) configured to provide attitude of rotorcraft, and wherein the controller architecture is further programmed to generate the delta-theta and delta-Psi as a function of the attitude.

5. The system of claim 1, wherein the controller architecture is external to the searchlight apparatus.

6. The system of claim 1, further comprising a laser range finder, and wherein the controller architecture is further programmed to:
    generate an estimated altitude based on data from the laser range finder, and the elevation angle.

7. The system of claim 1, wherein the controller architecture is further programmed to:
    receive a pilot override, and, responsive to the pilot override:
    cease updating theta as a function of dtheta/dt; and
    cease updating Psi as a function of dPsi/dt.

8. A system for moving an illumination spot of a beam emitted by a searchlight on a mobile platform at a constant groundspeed, the system comprising:
    a controller module, the controller module configured to:
        reference a known mounting orientation on the mobile platform for the searchlight;
        compute attitude of the mobile platform;
        compute an elevation angle (theta) of the beam as a function of the attitude of the mobile platform, an elevation actuator angle and the known mounting orientation for the searchlight;
        compute an azimuth angle, Psi, of the beam as a function of the attitude, the azimuth actuator angle and the known mounting orientation for the searchlight; and
    an input interface module operating onboard the mobile platform, the input interface module configured to:
        receive a searchlight control command from a pilot;

generate, as a function of the searchlight control command, a slew azimuth signal and a slew elevation signal; and communicate the slew azimuth signal and slew elevation signal to the searchlight control module;

the controller module further configured to:

determine, responsive to the slew elevation signal and slew azimuth signal, a respective rate of change of theta, dtheta/dt and a rate of change of Psi, dPsi/dt, required to maintain the constant groundspeed of the illumination spot, as a function of the SL-status data;

update theta responsive to the determined dtheta/dt;

update Psi responsive to the determined dPsi/dt; and generate azimuth actuator commands and elevation actuator commands, as a function of dtheta/dt and dPsi/dt.

9. The system of claim 8, wherein the controller module is further configured to:

determine a delta-theta based on the result from dtheta/dt;

determine a delta-psi based on the result from dPsi/dt;

wherein updating theta is further responsive to delta-theta; and wherein updating Psi is further responsive to delta-Psi.

10. The system of claim 8, wherein the controller module is further configured to receive attitude angles from an attitude and heading reference system (AHRS); and generate the delta-theta and delta-Psi as a function of the attitude.

11. The system of claim 8, wherein the searchlight is located within a searchlight apparatus, and the controller module is external to the searchlight apparatus.

12. The system of claim 8, wherein the controller module is further configured to:

generate an estimated altitude based on data received from a laser range finder, and the elevation angle.

13. The system of claim 8, wherein the controller module is further configured to:

receive a pilot override; and cease updating theta as a function of dtheta/dt, responsive to the pilot override; and cease updating Psi as a function of dPsi/dt, responsive to the pilot override.

14. A method for moving an illumination spot of a beam emitted by a searchlight on a mobile platform at a constant groundspeed, the method comprising:

at a processor, receiving SL-status data comprising an attitude for the mobile platform;

computing an elevation angle, theta, of the beam as a function of the attitude, an elevation actuator angle and a known mounting orientation for the searchlight;

receiving a searchlight control command comprising a searchlight elevation control command and an azimuth control command from a user input device;

determining, responsive to the searchlight elevation control command, a respective rate of change of theta, dtheta/dt, required to maintain the constant groundspeed of the illumination spot, as a function of the SL-status data;

determining, responsive to the searchlight azimuth control command, a respective rate of change of Psi, dPsi/dt, required to maintain the constant groundspeed of the illumination spot, as a function of the SL-status data;

generating elevation actuator commands, as a function of dtheta/dt; and generating azimuth actuator commands as a function of dPsi/dt.

15. The method of claim 14, further comprising:

determining a delta-theta based on the result from dtheta/dt; and wherein updating theta is further responsive to delta-theta.

16. The method of claim 14, further comprising:

determining a delta-psi based on the result from dPsi/dt; and wherein updating Psi is further responsive to delta-Psi.

17. The method of claim 14, further comprising receiving attitude angles from an attitude and heading reference system (AHRS) and further comprising, generating the delta-theta and delta-Psi as a function of the attitude of the rotorcraft.

18. The method of claim 14, wherein the searchlight is located within a searchlight apparatus, and the processor is external to the searchlight apparatus.

19. The method of claim 14, further comprising generating an estimated altitude based on data from a laser range finder, and the elevation angle.

20. The method of claim 14, further comprising:

receiving a pilot override; and ceasing updating theta as a function of dtheta/dt, responsive to the pilot override; and ceasing updating Psi as a function of dPsi/dt, responsive to the pilot override.

* * * * *